No. 782,088. Patented February 7, 1905.

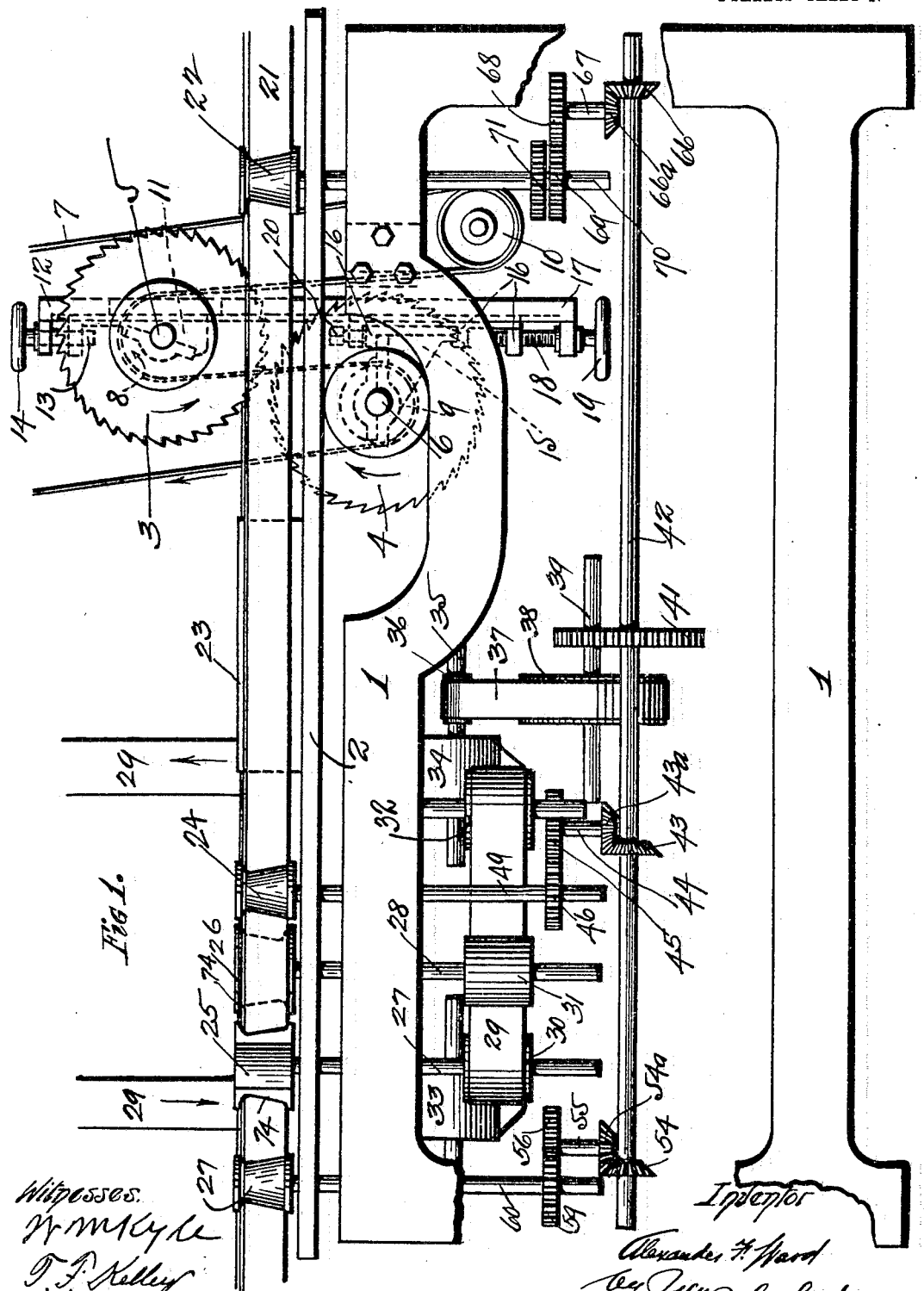

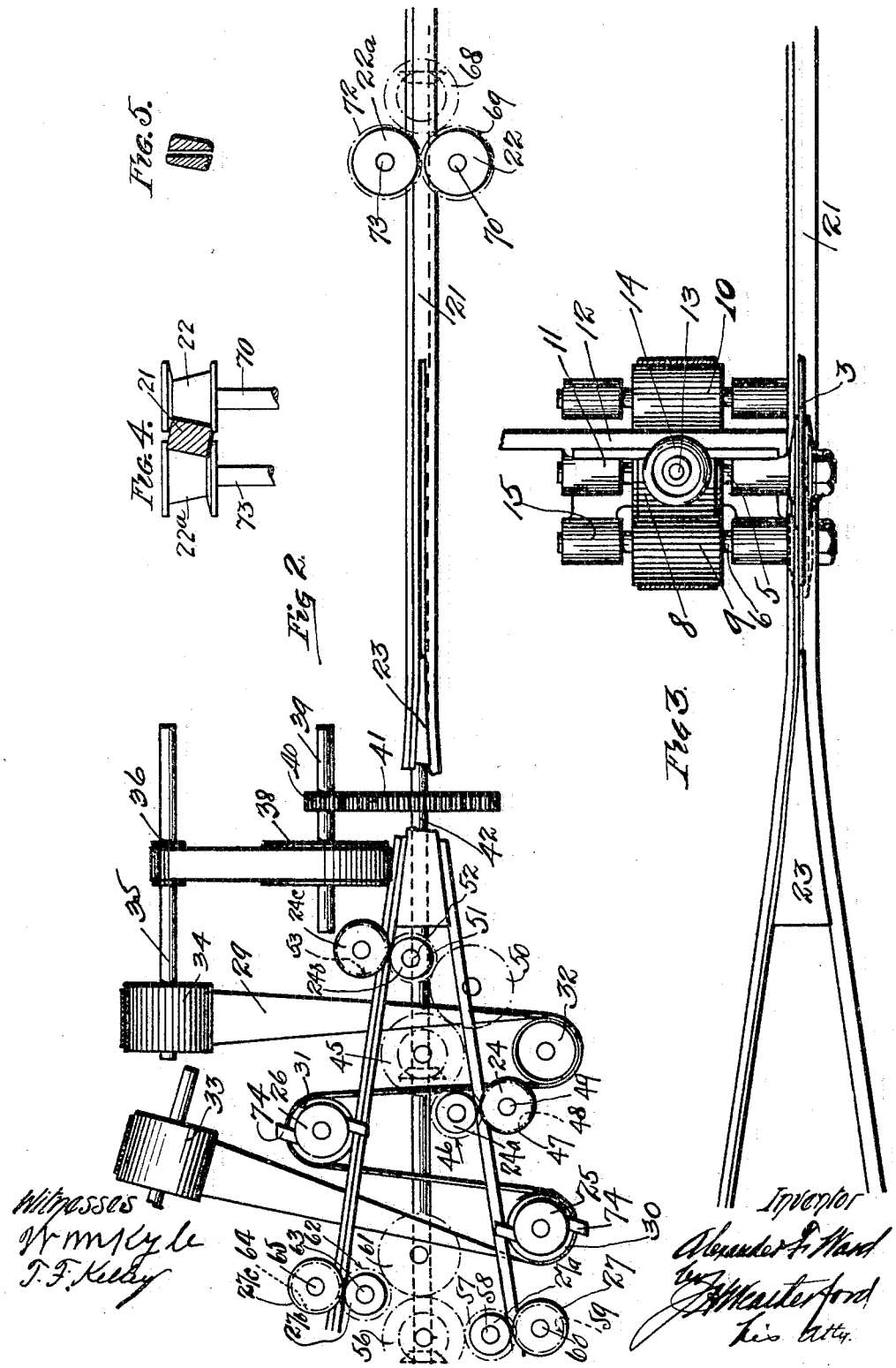

UNITED STATES PATENT OFFICE.

ALEXANDER F. WARD, OF MEMPHIS, TENNESSEE.

HOOP-SAWING MACHINERY.

SPECIFICATION forming part of Letters Patent No. 782,088, dated February 7, 1905.

Application filed April 9, 1903. Serial No. 151,857.

*To all whom it may concern:*

Be it known that I, ALEXANDER F. WARD, a citizen of the United States, residing at Memphis, Shelby county, State of Tennessee, have invented certain new and useful Improvements in Hoop-Sawing Machinery, of which the following is a specification.

My invention relates to certain new and useful improvements in hoop-sawing machinery, and has especial reference to improvements in same whereby hoops may be sawed straight and true from all kinds of stock.

The objects of my invention are, first, to provide a new and efficient means of sawing stock whereby the kerf will be perfectly straight and will have no tendency to draw from one side to the other and whereby a thinner saw can be used; second, to provide means whereby the feed will be regulated by the planer-knives and will instantly stop when they stop; third, to provide means of adjustment of the saws whereby they may be brought into proper cutting relation; fourth, to generally improve the details of construction. I carry out these objects as will be more fully hereinafter set forth in the drawings, specifications, and claims.

In making hoops by sawing it is customary to first saw out "hoop-stock," as it is called, being a rectangular piece of material of sufficient size to make two finished hoops after allowing for the saw-cut by which it is split. The stock is then passed through a machine which splits it and goes thence to planers which dress the outside. Hoops are made ordinarily thicker on one edge than on the other, and the stock is therefore inclined at an angle to the plane of the saws, thus making two hoops of identical cross-sections, one (as they come from the saw) large at the top, the other large at the bottom. It has been found in practice in using cross-grained or twisted stock, and especially in using stock having a decided longitudinal grain, that the saw follows the twist or grain and leads out of the stock, thus spoiling one or both hoops.

One of the objects of my invention is, as before stated, to obviate this difficulty, and I do this, as will be further shown, by providing two saws, each sawing approximately to the center of the stock.

In the drawings, Figure 1 is a side elevation of the machine, showing the saws for splitting the hoop-stock and showing the said hoop-stock as it appears while passing the saws and planer-knives. Fig. 2 is a plan view showing the stock being fed in, with the saws and saw-heads removed, and showing the planer-knives and the feed-rolls and in dot-and-dash lines the manner of connecting from the main feed drive-shaft to the feed-rolls. Fig. 3 is the plan view of the saw-heads and saws. Fig. 4 is an end elevation showing inclination of stock as it is fed to the saws. Fig. 5 shows a cross-section of the two hoops cut from one piece of stock, showing rounded corners made by planer-knives in finishing hoop after the saw-cut has been made.

In all the views the bearings for the shafts with a single exception, those for the saw-mandrels, have been omitted for purpose of clearness.

Referring now to the drawings, in which like numerals indicate the same or like parts in all the views, 1 1 is the frame of the machine, 2 is a feed-table, and 3 4 the upper and lower saws, respectively. The saws 3 4 are mounted on mandrels 5 6, respectively, and are driven by a single belt 7, which passes over the pulleys 8 9 on these mandrels, and thence over a tighter pulley 10. The upper saw 3 on the mandrel 5 is mounted in a bracket-bearing 11, which is vertically adjusted in a frame 12 by means of a screw 13 and hand-wheel 14, so that the bottom of its cut may be brought at any desired height. The saw 4 on the mandrel 6 is mounted in a bracket-bearing 15, and this in turn in a frame 16, which is raised and lowered in the frame 17 by a screw 18 and wheel 19. The bearing 15 has a cross-adjustment in the frame 16, so that it can be moved from one side to the other to permit of lining the saws. 20 is a set-screw which holds the said bearing 15 against movement in this frame when it has been adjusted.

The hoop-stock 21 is fed to the saws 3 4 by means of feed-rolls 22, mounted just in front of them. After passing the saws the two sections are spread apart by a wedge 23 and thence pass into feed-rolls 24 24$^a$ and 24$^b$ 24$^c$, which feed them, respectively, to the planer-heads 25 and 26. They then pass into feed-rolls 27 27$^a$ and 27$^b$ 27$^c$, by which each is discharged independently when finished. The planer-heads 25 and 26 are mounted on shafts 27 and 28, respectively, and are driven by a belt 29, passing over pulleys 30 and 31, respectively, and thence over a tightener 32. The belt 29 as it enters the machine comes over a horizontal pulley 33, thence turns at right angles, passing over the pulley 30, which is a vertical one, thence to the pulley 31 and the tightener-pulley 32, both also vertical, and thence at right-angles over the horizontal pulley 34 and out of the machine. On the same shaft 35 as this pulley 34 is a second pulley 36, which is connected by a belt 37 with a feed drive-pulley 38. The pulley 38 is mounted on a shaft 39, which also carries a pinion 40, and this pinion drives a gear 41, which is mounted on the main feed-shaft 42. It will be seen that if the belt 29 should break or slip and the planer-heads 25 and 26 thereby stop the feed-shaft 42 would stop and the feed for the entire machine be stopped. The feed-shaft 42 carries a bevel-gear 43, which meshes with a bevel-gear 43$^a$ on a vertical shaft 44, which shaft carries a gear 45, which meshes with a gear 46 on the shaft 47, which carries the feed-rolls 24. The gear 46 in turn meshes with a gear 48, mounted on the corresponding shaft 49, which carries the opposite feed-roll 24$^a$. The gear 45 also meshes with an immediate gear 50 and this with a gear 51 on the shaft 52, which carries the feed-roll 24$^b$. This gear 51 also meshes with a gear 53, which drives the corresponding feed-roll 24$^c$. A second bevel-gear 54 is also mounted on the shaft 42, and this gear meshes with a bevel-gear 54$^a$, mounted on a shaft 55, which carries also a gear 56. The gear 56 meshes with a gear 57, mounted on the shaft 58, which carries the feed-roll 27$^a$, and this gear 57 also meshes with a gear 59, mounted on the shaft 60, which carries the feed-roll 27. The gear 56 meshes also with an immediate gear 61, which meshes with a gear 62 on the shaft 63, carrying the feed-roll 27$^b$. The gear 62 meshes also with a gear 64, mounted on the shaft 65, which carries the feed-roll 27$^c$. The shaft 42 extends forward also toward the front end of the machine and carries a third bevel-gear 66, which meshes with a gear 66$^a$ on the shaft 67, which shaft carries a gear 68, meshing with a gear 69 on the shaft 70, which carries the feed-roll 22. On the same shaft 70 a gear 71 is mounted, which gear meshes with a gear 72 on the shaft 73, which carries the feed-roll 22$^a$. It will be seen that the shaft 42 governs the entire feed of the machine and that when this shaft stops consequent upon the breaking of the belt 29, as before described, the entire feed for the machine stops. Should the saws stop, the feed would be instantly blocked by the stock itself feeding against the saw.

The stock 21 is fed to the feed-rolls 22 22$^a$ and by them is fed to the saws 3 4. These saws cut each one-half way through the stock, the two saws being required to make the complete cut. In this way the periphery only of the saw is used and the saw projects only a short distance into the stock and an absolutely straight cut is made. In this it differs from the top-saw sawmill, in which the bottom saw cuts its entire depth in the stock and the upper finishes the cut and in which the lower saw has a great tendency to lead out of line.

In my hoop-saw machine I make the saws cut equal amounts, thus cutting with each to the center of the stock or very slightly beyond and securing an absolutely straight cut. These saws are provided with adjustment—the top saw with a single vertical adjustment and the lower with a vertical and horizontal adjustment, by the first of which they may be made to make a complete cut through the stock even when the saws have become worn and by the second be brought into line. The stock passes from the saws to the wedge 23 and by this wedge is spread apart and directed to the feed-rolls, one piece passing to rolls 24 24$^a$ and the other to rolls 24$^b$ 24$^c$ and being by them fed to the planer-heads 25 26, respectively. After being dressed by these planer-heads the stock passes through discharging-rolls 27 27$^a$ and 27$^b$ 27$^c$, respectively, and is by them discharged to the stock-pile. It will be noted in this connection that the feed-rolls 22, 22$^a$, 24, 24$^c$, 27, and 27$^c$ are made conical, with flanges top and bottom, and that the knives 74 of the planer-heads 25 and 26 have virtually the same inclination. The feed-rolls 22, 24, and 27 have the smaller end of the cone upward—the corresponding feed-rolls 22$^a$, 24$^c$, and 27$^c$ having the larger end of the cone at the top. The rectangular stock, therefore, coming between the cones 22 22$^a$ is given an inclination to one side corresponding to the bevel desired for the hoops, while after passing the saws the outer rolls 24, 24$^c$, 27, and 27$^c$ have a corresponding inclination, and the inner rolls 24$^a$, 24$^b$, 27$^a$, and 27$^b$ are made true cylinders to come against the flat-sawed surface of the hoop. The planer-knives 74 dress the outer surface of the stock, rounding the corners as may be desired.

While I have described the saws 3 and 4 as cutting to the middle of the kerf in sawing hoops, I wish it distinctly understood that this may be departed from and that one saw may be made to do a slightly larger part of the cutting than the other, and in cases where stock varies in sizes through a considerable range one saw may do practically all the cutting on small stock.

Having now fully described my invention, what I claim, and desire to secure by Letters Patent in the United States, is—

1. In a hoop resawing and planing machine, the combination with vertical saws and feed-rolls carried by vertical shafts and having their faces inclined to the plane of said saws, of planer-heads behind said saws, a wedge to open the sawed stock and sets of feed-rolls each set comprising a cylindrical and a conical roll to feed the stock to the planer-heads.

2. In a hoop resawing and planing machine, the combination with vertical saws and feed-rolls carried by vertical shafts and having their faces inclined to the plane of said saws, of planer-heads behind said saws, a wedge to open the sawed stock and sets of feed-rolls, each set comprising a cylindrical and a conical roll to feed the stock to the planer-heads, a single feed-shaft driving all of the said feed-rolls and a single belt driving said planer-heads and said feed-shaft.

In testimony whereof I have signed my name to this specification in the presence of two subscribing witnesses.

ALEXANDER F. WARD.

Witnesses:
 G. W. MILLER,
 F. M. GUTHRIE.